US011428347B2

(12) United States Patent
Gauch et al.

(10) Patent No.: US 11,428,347 B2
(45) Date of Patent: Aug. 30, 2022

(54) FIRE-PROTECTION COLLAR

(71) Applicants: PROMAT AUSTRALIA PTY. LTD, Adelaide (SA); ETEX BUILDING PERFORMANCE GMBH, Linz (AT)

(72) Inventors: Edwin S. Gauch, Wilhering (AT); Raymond Porter, Heathfield (AU)

(73) Assignees: Promat Australia Pty Ltd, South Australia (AU); Etex Building Performance GmbH, Linz (AT)

(*) Notice: Subject to any disclaimer, the term of this patent is extended or adjusted under 35 U.S.C. 154(b) by 126 days.

(21) Appl. No.: 16/498,738

(22) PCT Filed: Mar. 29, 2018

(86) PCT No.: PCT/EP2018/058212
§ 371 (c)(1),
(2) Date: Sep. 27, 2019

(87) PCT Pub. No.: WO2018/178297
PCT Pub. Date: Oct. 4, 2018

(65) Prior Publication Data
US 2021/0116055 A1 Apr. 22, 2021

(30) Foreign Application Priority Data
Mar. 31, 2017 (EP) ..................... 17164150

(51) Int. Cl.
| F16L 5/04 | (2006.01) |
| A62C 2/06 | (2006.01) |
| A62C 3/16 | (2006.01) |
| H02G 3/04 | (2006.01) |
| H02G 3/06 | (2006.01) |

(52) U.S. Cl.
CPC .............. *F16L 5/04* (2013.01); *A62C 2/065* (2013.01); *A62C 3/16* (2013.01); *H02G 3/0412* (2013.01); *H02G 3/06* (2013.01)

(58) Field of Classification Search
CPC . A62C 2/065; F16L 5/04; E04B 1/947; H02G 3/0412; H02G 3/22
USPC ........................................ 52/219, 220.8, 221
See application file for complete search history.

(56) References Cited

U.S. PATENT DOCUMENTS

| 5,058,341 A * | 10/1991 | Harbeke, Jr. .......... A62C 2/065 52/317 |
| 5,103,609 A * | 4/1992 | Thoreson ............... A62C 2/065 52/232 |
| 5,155,957 A * | 10/1992 | Robertson ................ F16L 5/04 52/220.8 |

(Continued)

FOREIGN PATENT DOCUMENTS

| DE | 2 942 333 A1 | 4/1981 |
| DE | 10 2004 014347 A1 | 10/2005 |

(Continued)

*Primary Examiner* — Paola Agudelo
*Assistant Examiner* — Adam G Barlow
(74) *Attorney, Agent, or Firm* — Dilworth & Barrese, LLP

(57) ABSTRACT

The present invention relates to a fire-protection-collar element (10) for forming a fire-protection collar (35) for closing through-passages in walls (38), ceilings and/or floors in the event of a fire. The present invention also relates to a method for forming a fire-protection collar (35) for closing through-passages in walls (38), ceilings and/or floors in the event of a fire.

14 Claims, 8 Drawing Sheets

(56) References Cited

U.S. PATENT DOCUMENTS

| | | | | |
|---|---|---|---|---|
| 5,351,448 | A * | 10/1994 | Gohlke | H02G 3/22 52/220.8 |
| 5,421,127 | A * | 6/1995 | Stefely | A62C 2/06 52/220.8 |
| 5,498,466 | A * | 3/1996 | Navarro | C09K 21/14 428/305.5 |
| 5,586,739 | A * | 12/1996 | Gantner | F16L 5/04 248/500 |
| 5,887,395 | A * | 3/1999 | Navarro | F16L 5/04 428/920 |
| 5,887,396 | A * | 3/1999 | Thoreson | A62C 2/065 52/220.8 |
| 5,970,670 | A * | 10/1999 | Hoffman | A62C 2/065 52/317 |
| 6,029,412 | A * | 2/2000 | Gohlke | F16L 5/04 137/75 |
| 6,360,502 | B1 * | 3/2002 | Stahl, Jr. | A62C 2/065 52/220.8 |
| 6,725,615 | B1 * | 4/2004 | Porter | F16L 5/04 52/99 |
| 7,082,730 | B2 * | 8/2006 | Monden | F16L 5/04 52/220.8 |
| 8,776,462 | B2 * | 7/2014 | Foerg | A62C 2/065 52/220.8 |
| 9,145,987 | B2 * | 9/2015 | Muenzenberger | F16B 15/0015 |
| 9,861,843 | B2 * | 1/2018 | Paetow | A62C 2/065 |
| 2007/0151183 | A1 * | 7/2007 | Stahl | F16L 5/04 52/317 |
| 2011/0180278 | A1 * | 7/2011 | Magnay | A62C 2/065 169/48 |
| 2011/0210222 | A1 * | 9/2011 | Van Walraven | F16M 13/02 248/315 |
| 2012/0304979 | A1 * | 12/2012 | Munzenberger | H02G 3/088 126/314 |
| 2013/0097948 | A1 * | 4/2013 | Burgess | E04B 2/82 52/232 |
| 2013/0331489 | A1 * | 12/2013 | Kreh | C08K 5/11 524/308 |
| 2014/0077043 | A1 * | 3/2014 | Foerg | H02G 3/0412 248/74.1 |

FOREIGN PATENT DOCUMENTS

| | | |
|---|---|---|
| DE | 10 2008 059564 A1 | 6/2010 |
| EP | 0 486 299 A1 | 5/1992 |
| EP | 2 505 891 A1 | 10/2012 |
| EP | 2 578 274 A2 | 4/2013 |
| EP | 2 578 106 A1 | 5/2013 |

* cited by examiner

Fig. 7
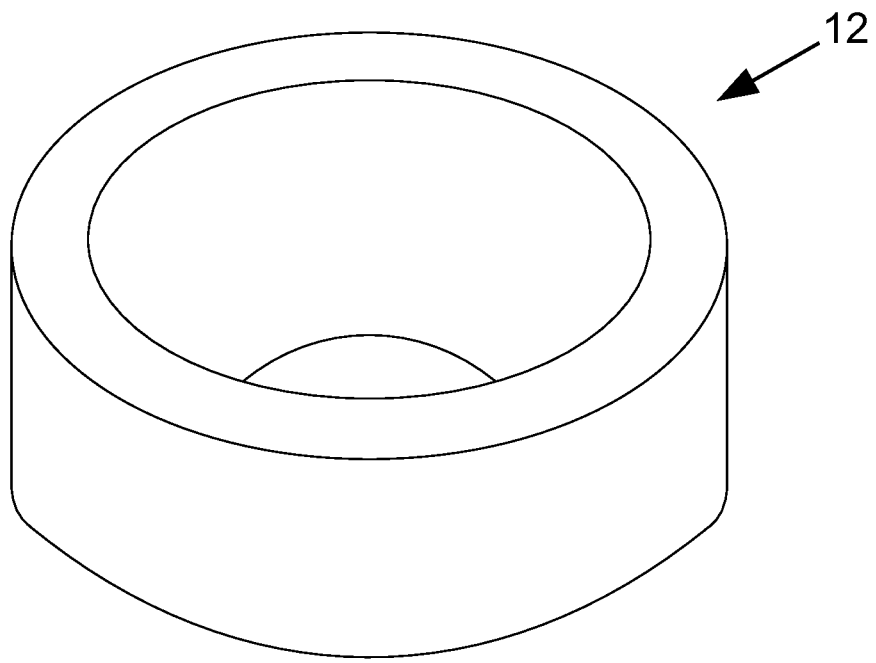
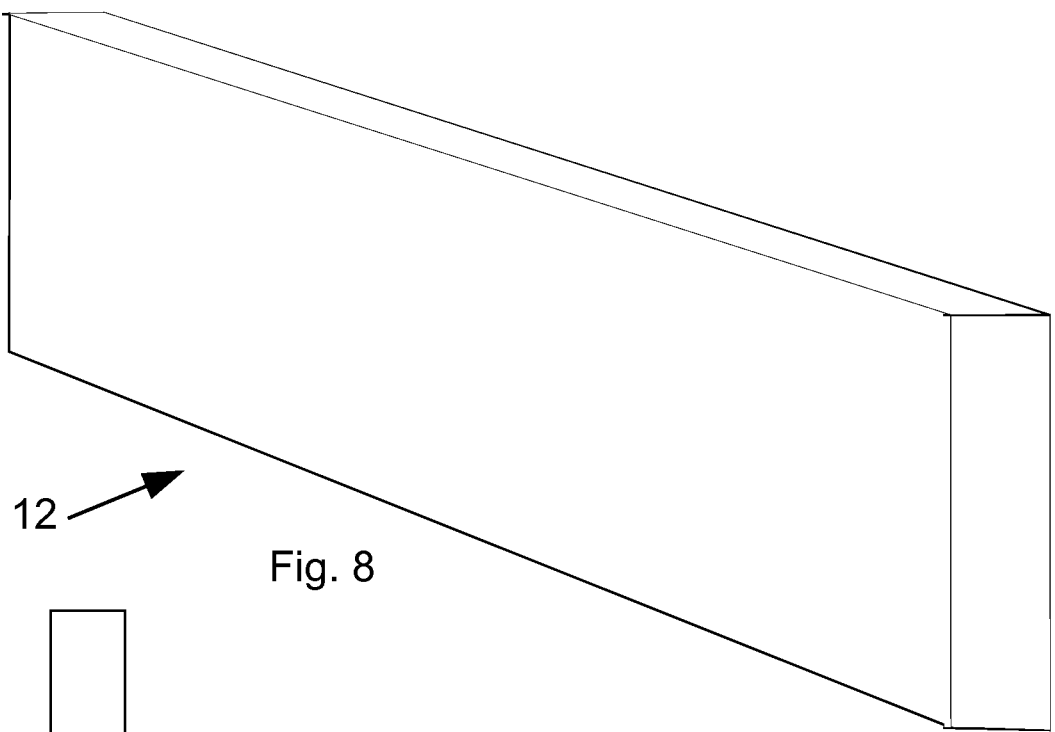
Fig. 8
Fig. 9

FIRE-PROTECTION COLLAR

The present invention relates to a fire-protection-collar element for forming a fire-protection collar for closing through-passages in walls, ceilings and/or floors in the event of a fire.

The present invention also relates to a method for forming a fire-protection collar for closing through-passages in walls, ceilings and/or floors in the event of a fire.

The prior art discloses the practice of using fire-protection collars within buildings to close in particular feed-throughs for cables and/or non-fire-resistant pipes in walls, ceilings or floors in order to protect against fire and/or smoke in the event of a fire and thus to avoid, in the event of a fire, fire and/or smoke spreading from one room into another room and the feed-throughs being adversely affected by the fire.

The prior art discloses various configurations of such fire-protection collars, which are usually installed in front of a wall, ceiling or floor opening which allows a pipe to pass through. A fire-protection collar usually has an intumescent material, which is arranged around a non-fire-resistant pipe. The intumescent material of the fire-protection collar here is usually arranged on or in a metallic sheath, which further serves, in particular with at least one holder, for fastening the fire-protection collar on walls, ceilings and/or floors by means of screws or similar fastening means.

The disadvantage with the already known fire-protection collars is, in particular, that they have a relatively large number of individual elements or components and, on account of their configuration, usually cannot be adapted with any particular degree of flexibility to different openings of feed-throughs or to pipes and/or lines of different cross sections.

In view of the already known prior art, the present invention is based on the object of providing a fire-protection collar which is intended for closing through-passages in walls, ceilings and/or floors in the event of a fire, can be produced straightforwardly and cost-effectively, in particular with only a small number of individual elements or components, and can be adapted in a flexible manner to different openings of feed-throughs or to pipes and/or lines of different cross sections.

This object is achieved in technical terms by the present invention providing a fire-protection-collar element for forming a fire-protection collar for closing through-passages in walls, ceilings and/or floors in the event of a fire, having at least one lining which is made of or comprises a material which increases in volume in the event of a fire, preferably an intumescent material, and is positioned or fitted on the inner surface of a fireproof sheath, preferably made of metal, which is or can be formed in an essentially tubular or annular manner, wherein the sheath is or can be formed by at least one thin, preferably strip-like foil, and wherein, on at least one side of the essentially tubular or annular sheath, the lining projects at least partially beyond the essentially tubular or annular sheath.

The sheath advantageously forms essentially the outer side of the fire-protection collar, wherein preferably the outer surface of the sheath forms the outer side of the fire-protection collar. The sheath, in the context of the present invention, advantageously surrounds the material which increases in volume in the event of a fire, preferably the intumescent material, and is located preferably exclusively on the outer side of the material which increases in volume in the event of a fire, preferably the intumescent material.

The lining is advantageously a tube or ring or is or can be formed by at least one strip made of or comprising a material which increases in volume in the event of a fire, preferably an intumescent material.

A further advantageous configuration of the invention is characterized by an integral and preferably essentially adhesive-free connection between the sheath and lining.

A further advantageous configuration of the invention is characterized by the sheath being embedded or accommodated preferably in an essentially surface-flush manner in the lining. The fire-protection-collar element according to the invention can thus advantageously be rendered more robust, in particular such that the sheath and the lining cannot so easily become detached from one another.

The sheath, preferably the foil which forms the sheath, is advantageously bimetallic. In particular the use of two metals of different coefficients of linear expansion is advantageous here. Rendering the sheath, in particular the foil, of the fire-protection-collar element bimetallic can advantageously ensure that the lining arranged beneath the metal foil, preferably the lining-forming strip made of or comprising a material which is preferably intumescent in the event of a fire, is retained on the enclosed pipe or the enclosed line or pipeline even in the event of a fire.

A further advantageous configuration of the invention is characterized in that the foil which forms the sheath is a flexible metal foil and has a thickness of approximately 10 µm to approximately 100 µm, preferably of approximately 30 µm to approximately 80 µm.

The lining is or can advantageously be formed from or by a non-prefoamed material which increases in volume in the event of a fire, preferably an intumescent material. Using such a material means that the latter expands to a relatively great extent in the event of a fire, or such a material expands a number of times in the event of a fire. In addition to providing for further-improved prevention of the penetration of smoke and/or fire in the event of a fire, such a material also has an insulating effect.

A preferred configuration of the invention is characterized in that the fire-protection-collar element is a fire-protection-collar band, having a strip which is made of or comprises a material which increases in volume in the event of a fire, preferably an intumescent material, and is positioned or fitted on a fireproof and essentially strip-like foil, preferably made of metal. A further advantageous configuration of the invention is characterized by a maximum overall thickness of the fire-protection-collar band ranging from 3 mm to 7 mm, preferably ranging from approximately 3.5 mm to approximately 6 mm. It has been established that, with a maximum overall thickness according to the invention, it is possible to achieve a better bending capability of the fire-protection-collar band, and this provides for, in particular, more straightforward adaptation to lines and/or pipes of relatively small cross sections.

To this extent, as far as a fire-protection-collar element is concerned, the present invention relates, in particular, to a fire-protection-collar band having a strip which is made of or comprises a material which increases in volume in the event of a fire, preferably an intumescent material, and is positioned or fitted on a fireproof and essentially strip-like foil, preferably made of metal, wherein the side peripheries of the strip which is made of or comprises a material which increases in volume in the event of a fire, preferably an intumescent material, which run in the direction of the longitudinal extent of the fire-protection-collar band are spaced apart from the side peripheries of the foil which run in the direction of the longitudinal extent of the fireprotection-collar band and the width of the strip made of or comprising a material which increases in volume in the event of a fire, preferably an intumescent material, is greater than the width of the foil.

According to the invention, it is also possible for the foil to be positioned or fitted on the strip made of or comprising a material which increases in volume in the event of a fire, preferably an intumescent material.

The invention here exploits, in particular, the finding that, if use is made of a fireproof and essentially strip-like foil on which a strip made of or comprising a material which increases in volume in the event of a fire, preferably an intumescent material, is positioned, the fire-protection collar is easy to make, in particular by virtue of the fire-protection-collar band being cut to any desired length, for example by means of scissors or side cutters. In particular on account of its flexibility, the fire-protection-collar band according to the invention can also be adapted straightforwardly to different openings of feed-throughs or pipes and/or lines of different cross sections.

An advantageous configuration of the invention is characterized by an integral and preferably essentially adhesive-free connection between the foil and strip made of or comprising a material which increases in volume in the event of a fire, preferably an intumescent material.

A further advantageous configuration of the invention is characterized by the foil being embedded or accommodated preferably in an essentially surface-flush manner in the strip made of or comprising a material which increases in volume in the event of a fire, preferably an intumescent material. The fire-protection-collar band according to the invention can thus advantageously be rendered more robust, in particular such that the foil and the strip made of or comprising a material which increases in volume in the event of a fire, preferably an intumescent material, cannot so easily become detached from one another. It is also made possible, in the case of the configuration according to the invention, for a plurality of layers of the fire-protection-collar band to be arranged one above the other, in particular by being wrapped a number of times around a pipe, without this resulting in the formation, between the individual layers, of gaps or offsets, which would otherwise arise on account of the foil being placed in position.

The foil of the fire-protection-collar band according to the invention is advantageously bimetallic. In particular the use of two metals of different coefficients of linear expansion is advantageous here. Rendering the foil of the fire-protection-collar band bimetallic can advantageously ensure that the strip made of or comprising a material which is preferably intumescent in the event of a fire, said strip being arranged beneath the flexible metal foil, is retained on the enclosed pipe or the enclosed line even in the event of a fire.

According to a preferred configuration of the invention, provision is made for the foil to be a flexible metal foil and to have a thickness of approximately 10 µm to approximately 100 µm, preferably of approximately 30 µm to approximately 80 µm. Selecting such properties for the foil can ensure that, while the amount of material used is as small as possible, sufficient stability of the fire-protection-collar band is achieved. It is thus advantageously possible to achieve a comparatively low weight for the fire-protection-collar band without this having an adverse effect on the fire-protection properties relating to the design of a fire-protection collar.

In a further advantageous configuration of the fire-protection-collar band according to the invention, provision is made for the strip made of or comprising a material which increases in volume in the event of a fire, preferably an intumescent material, to be made of a non-prefoamed material. Using such a material means that the latter expands to a relatively great extent in the event of a fire, or such a material expands a number of times in the event of a fire. In addition to providing for further-improved prevention of the penetration of smoke and/or fire in the event of a fire, such a material also has an insulating effect.

A further configuration of the invention is characterized by a maximum overall thickness of the fire-protection-collar band ranging from 3 mm to 7 mm, preferably ranging from approximately 3.5 mm to approximately 6 mm. It has been established that, with a maximum overall thickness according to the invention, it is possible to achieve a better bending capability of the fire-protection-collar band, and this provides for, in particular, more straightforward adaptation to lines and/or pipes of relatively small cross sections.

A further advantageous configuration of the invention provides for the fire-protection-collar element to have at least one holder, preferably three holders, by means of which a fire-protection collar formed for closing through-passages in walls, ceilings and/or floors in the event of a fire is fastened on a structural part, in particular a wall, a ceiling and/or a floor of a room, wherein the holder has, or each of the holders has, a portion for fastening the holder on a structural part, in particular wall, ceiling and/or floor of a room, and a portion having means for anchoring and/or fixing the holder on the fire-protection-collar element.

The present invention also relates to a holder by means of which a fire-protection collar formed for closing through-passages in walls, ceilings and/or floors in the event of a fire is fastened on a structural part, in particular a wall, a ceiling and/or a floor of a room, having a portion for fastening the holder on a structural part, in particular wall, ceiling and/or floor of a room, and having a portion with means for anchoring and/or fixing the holder on a fire-protection-collar element.

The portion for fastening the holder on a structural part and the portion with means for anchoring and/or fixing a fire-protection-collar element on the holder advantageously enclose an angle, preferably an angle ranging from approximately 15° to approximately 135°, preferably an angle of approximately 90°.

The means for anchoring and/or fixing the holder on the fire-protection-collar element are advantageously lugs which can be bent around the side peripheries of the fire-protection-collar element and/or lugs which can be bent into the fire-protection-collar element.

The advantage of such a fire-protection-collar holder, in addition to the compact construction thereof, is, in particular, its straightforward handling capability during installation.

As far as a holder according to the invention is concerned, the fire-protection-collar element is advantageously a fire-protection-collar element having the features of a fire-protection-collar element according to the invention.

The holder is advantageously designed for accommodating a plurality of layers of a fire-protection-collar band according to the invention, wherein preferably the layers of the fire-protection-collar band can be arranged one above the other.

The fire-protection-collar element is advantageously a strip or is of strip-like design.

A further advantageous configuration of the invention provides for the fire-protection-collar element to have at least one closure for forming a fire-protection collar for closing through-passages in walls, ceilings and/or floors in the event of a fire, wherein the closure has a closure element which can be fastened at the first end of the fire-protection-collar band and a closure element which can be fastened at the second end of the fire-protection-collar band, the closure elements preferably having means for anchoring and/or fixing the respective closure element on the fire-protection-collar band and interacting means for connecting the closure elements.

The present invention also relates to a closure for a fire-protection-collar element which is designed preferably in the form of a fire-protection-collar band and is intended for forming a fire-protection collar for closing through-passages in walls, ceilings and/or floors in the event of a fire, having a closure element which can be fastened at the first end of the fire-protection-collar band and a closure element which can be fastened at the second end of the fire-protection-collar band, the closure elements having means for anchoring and/or fixing the respective closure element on the fire-protection-collar band and interacting means for connecting the closure elements.

The means for anchoring and/or fixing the respective closure element on the fire-protection-collar band are advantageously lugs which can be bent around the side peripheries of the fire-protection-collar band and/or lugs which can be bent into the fire-protection-collar band.

The interacting means for connecting the closure elements advantageously comprise at least one aperture on one of the closure elements and at least one lug on the other of the closure elements, it being possible for said lug to be brought into engagement with the aperture.

A closure configured according to the invention further improves the flexibility of a fire-protection collar according to the invention. The design of the closure allows the latter to be fitted straightforwardly on a fire-protection-collar band which has previously been cut to any desired length. A closure according to the invention advantageously comprises just two, or a maximum of three, components, and this simplifies both production and installation. Furthermore, it is possible for the closure to be installed on a fire-protection-collar band advantageously by straightforward means, for example by virtue of the means for anchoring and/or fixing the closure elements on the fire-protection-collar band, and the interacting means for connecting the closure elements, being mechanically deformed by bending, in particular, using a screwdriver or using a pair of pliers.

According to a preferred configuration of the invention, provision is made for the closure and/or the closure elements to be made of metal or sheet metal. The closure according to the invention can thus ensure a reliable connection to a fire-protection-collar band, and a reliable closure of the same, and can provide for feed-throughs to be sealed in particular in the event of a fire. The closure or the closure elements is/are advantageously made from metal, in particular sheet metal, and preferably with a thickness of approximately 0.5 mm to approximately 0.7 mm. With the amount of material used being as small as possible, this advantageously ensures sufficient stability of the closure or of the closure elements.

The fire-protection-collar element is advantageously a fire-protection-collar element having the features of a fire-protection element according to the invention.

The present invention also relates to a fire-protection-collar system for closing through-passages in walls, ceilings and/or floors in the event of a fire, comprising at least one fire-protection-collar element according to the invention, at least one closure according to the invention and at least one holder according to the invention, preferably three holders according to the invention.

The present invention also relates to a kit for forming a fire-protection collar for closing through-passages in walls, ceilings and/or floors in the event of a fire, comprising at least one fire-protection-collar element according to the invention, at least one closure according to the invention and at least one holder according to the invention, preferably three holders according to the invention.

In addition, the present invention relates to a method for forming a fire-protection collar for closing through-passages in walls, ceilings and/or floors in the event of a fire, characterized by the following steps:

arranging a fire-protection-collar element, preferably a fire-protection-collar element having the features of a fire-protection-collar element according to the invention, around at least one pipeline passing through a wall, a ceiling or a floor, in particular such that, under the action of an elevated temperature, in particular in the event of a fire, volume-increasing material, preferably intumescent material, of the fire-protection-collar element expands and closes the through-passage through the wall, the ceiling or the floor in order to prevent fire and/or smoke from spreading from one room into another room;

fastening at least one holder, preferably at least three holders, on the fire-protection-collar element, either before or after the fire-protection-collar element is arranged around the at least one pipeline, the holder preferably being one having the features of a holder according to the invention;

optionally aligning the at least one holder, preferably the at least three holders, in relation to the passage of the pipeline through the wall, the ceiling or the floor; and preferably fastening the at least one holder, preferably the at least three holders, by at least one fastening means, preferably a screw, on the wall, the ceiling or the floor.

An advantageous configuration of the invention provides for the fire-protection-collar element to be arranged at a distance around the at least one pipeline passing through the wall, the ceiling or the floor, preferably at a distance of more than 2 mm, preferably at a distance of more than 5 mm, or even at a distance of more than 10 mm. The distance preferably is below 25 mm; more preferably below 20 mm; and even more preferably below 15 mm. In particular embodiments, the distance is between 2 mm and 25 mm. In specific embodiments, the distance is between 2 mm and 20 mm. In further embodiments, the distance is between 5 mm and 15 mm.

A further advantageous configuration of the invention provides for the fire-protection-collar element to be arranged around the at least one pipeline passing through the wall, the ceiling or the floor by virtue of the pipeline being wrapped with a fire-protection-collar band in the region of the through-passage, by virtue of the fire-protection-collar band being provided with at least one closure, preferably a closure having the features of a closure according to the invention, in particular a closure which has a closure element which can be fastened at the first end of the fire-protection-collar band and a closure element which can be fastened at the second end of the fire-protection-collar band, the closure elements preferably having means for anchoring and/or fixing the respective closure element on the fire-protection-collar band and interacting means for connecting the closure elements, and by virtue of the at least one closure being closed, wherein the fire-protection-collar band is provided with at least one closure preferably either before or after the fire-protection-collar band is arranged around the at least one pipeline, and wherein the at least one closure is closed preferably either before or after the fire-protection-collar band is arranged around the at least one pipeline.

Further details, features and advantages of the invention will be explained more specifically hereinbelow with reference to the exemplary embodiments illustrated in the figures of the drawings, in which:

FIG. 7 shows a schematically perspective view of a further exemplary embodiment of a fire-protection element according to the invention;

FIG. 8 shows a schematically perspective view of an exemplary embodiment of a strip according to the invention made of or comprising material which increases in volume in the event of a fire;

FIG. 9 shows a side view according to FIG. 8; and

Figure 1A:
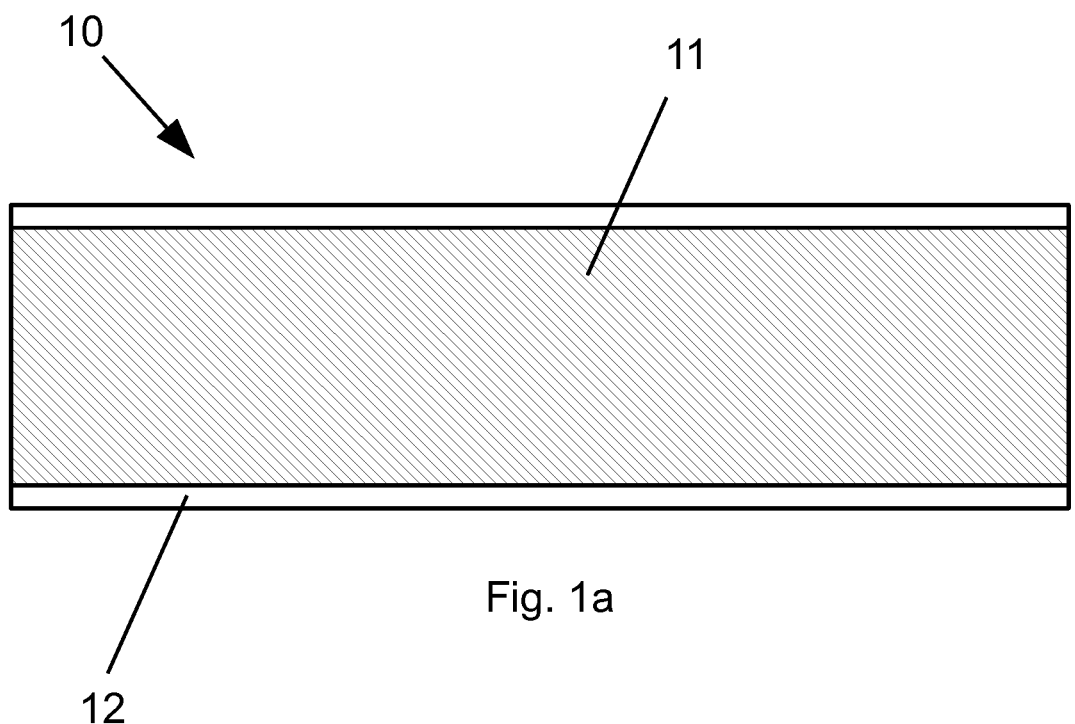
FIG. 1a shows a plan view of an exemplary embodiment of a fire-protection-collar element according to the invention, in this case in the form of a fire-protection-collar band according to the invention.

FIG. 1a shows a plan view of an exemplary embodiment of a fire-protection-collar element 10 according to the invention for forming a fire-protection collar for closing through-passages in walls, ceilings and/or floors in the event of a fire, having at least one lining 12 which is made of or comprises a material which increases in volume in the event of a fire, preferably an intumescent material, and is positioned or fitted on the inner surface of a fireproof and essentially tubular or annular sheath 11, preferably made of metal.

The fire-protection-collar element 10 in the present case is designed in the form of a fire-protection-collar band 10 having a strip 12 made of or comprising a material which increases in volume in the event of a fire, preferably an intumescent material, and having a fireproof and essentially strip-like foil 11, in the present case a flexible metal foil, preferably a bimetallic one, with a thickness of approximately 70 μm. The foil 11 here forms the sheath 11 of the fire-protection-collar element 10. The strip 12 here forms the lining 12 of the fire-protection-collar element 10. The side peripheries of the strip 12 which run in the direction of the longitudinal extent of the fire-protection-collar band 10 are spaced apart from the side peripheries of the foil 11 which run in the direction of the longitudinal extent of the fire-protection-collar band 10. The width of the strip 12 here is greater than the width of the foil 11.

The foil 11, which in the present case is positioned on the strip 12 made of or comprising a material which increases in volume in the event of a fire, preferably an intumescent material, gives the strip 12 increased stability and simplifies the installation of the same. The material of the strip 12 is advantageously a non-prefoamed material which advantageously expands for the first time in the event of a fire, under the action of heat.

Figure 1B:
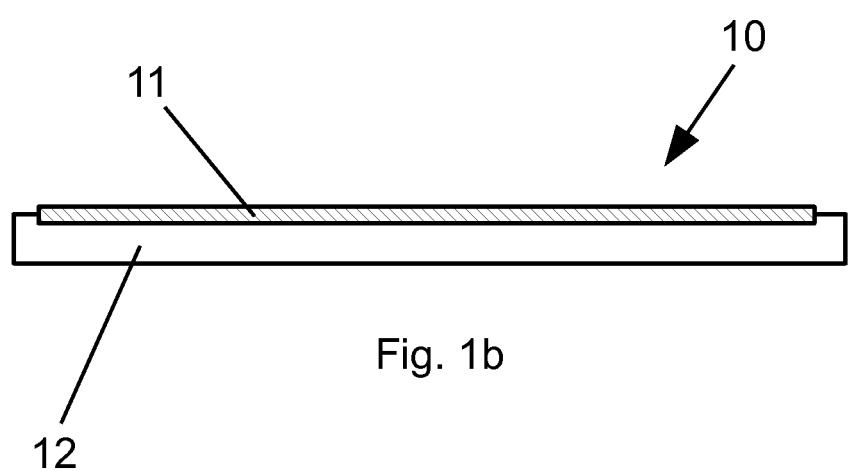
FIG. 1b shows a sectional side view of a further exemplary embodiment of a fire-protection-collar element according to the invention, in this case in the form of a fire-protection-collar band according to the invention.

FIG. 1b shows a sectional side view of a further exemplary embodiment of a fire-protection-collar band 10 according to the invention. The foil 11 here is at least partially embedded or accommodated in the strip 12 made of or comprising a material which increases in volume in the event of a fire. A preferred configuration (not illustrated explicitly here) of the invention provides for the foil 11 to be embedded or accommodated in an essentially surface-flush manner in the strip 12 made of or comprising a material which increases in volume in the event of a fire. It can be seen from FIG. 1b that the foil 11 has approximately half of its overall thickness embedded in the strip 12 made of or comprising a material which increases in volume in the event of a fire. It is thus advantageously possible to achieve a reliable connection between the foil 11 and strip 12 during production of a fire-protection-collar band 10 according to the invention and to ensure that, in particular when the fire-protection-collar band 10 is being processed or installed, the strip 12 does not become detached from the foil 11 or the foil 11 does not become detached from the strip 12. The robustness of a fire-protection-collar band 10 according to the invention is thus improved overall.

Both in the case of the exemplary embodiment according to FIG. 1a and in the case of the exemplary embodiment according to FIG. 1b, provision is also made for the fire-protection-collar band 10 to have a maximum overall thickness of 3.5 mm or a maximum overall thickness of 6 mm.

Figure 2A:
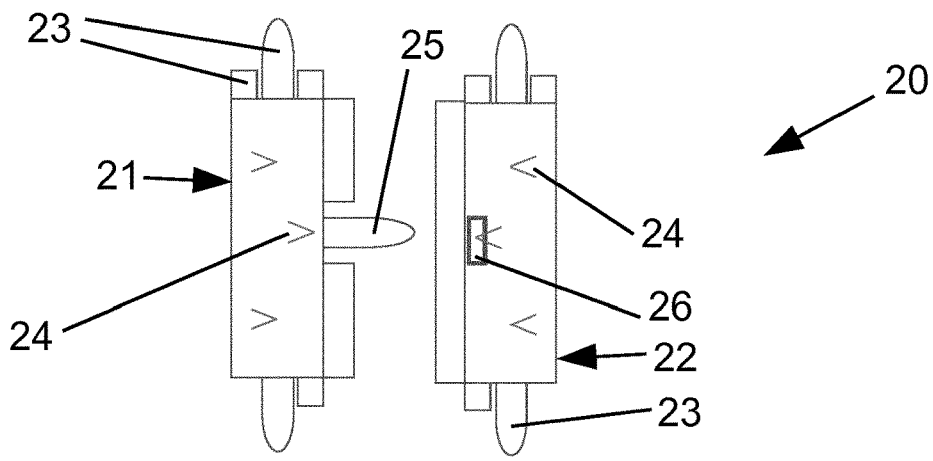
FIG. 2a shows a plan view of a first exemplary embodiment of a closure according to the invention for a fire-protection-collar element, in this case a fire-protection element in the form of a fire-protection-collar band according to the invention.

FIG. 2a shows a plan view of a first exemplary embodiment of a closure 20 according to the invention for a fire-protection-collar element 10 according to the invention, in this case a fire-protection-collar band 10 (not illustrated in FIG. 2a), having a closure element 21 which can be fastened at the first end of the fire-protection-collar band 10 and a closure element 22 which can be fastened at the second end of the fire-protection-collar band 10. The closure elements 21 and 22 of the closure 20, said closure elements being produced preferably from metal or sheet metal, have means 23 and 24 for anchoring and/or fixing the respective closure elements 21, 22 on the fire-protection-collar band 10. The closure elements 21 and 22 also have interacting means 25 and 26 for connecting the closure elements 21 and 22. The means 23 of the closure 20 are designed in the form of lugs 23 which can be bent around the side peripheries of the fire-protection-collar band 10. The means 24 of the closure 20 are designed in the form of lugs 24 which can be bent into the fire-protection-collar band 10. The interacting means 25 and/or 26 of the closure elements 21 and 22, respectively, are designed in the form of an aperture 26 on the closure element 22 and of a lug 25 on the closure element 21, it being possible for said lug to be brought into engagement with the aperture 26 of the closure element 22. The means 23, 24 and/or 25 of the closure elements 21 and 22 can advantageously be mechanically deformed or bent using a screwdriver, a pair of pliers or a similar tool and therefore provide for the closure 20 to be straightforwardly installed and closed.

Figure 2B:
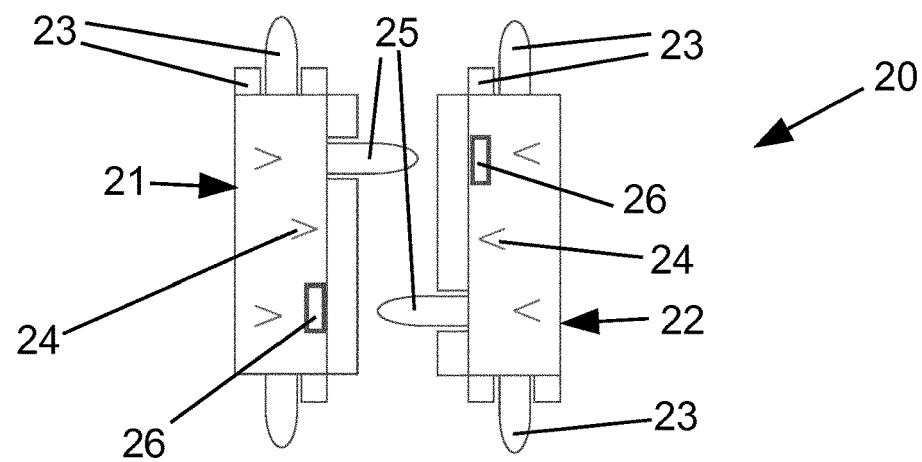
FIG. 2b shows a plan view of a second exemplary embodiment of a closure according to the invention for a fire-protection-collar element, in this case a fire-protection element in the form of a fire-protection-collar band according to the invention.

FIG. 2b shows a plan view of a second exemplary embodiment of a closure 20 according to the invention for a fire-protection-collar element 10 according to the invention, in the present case a fire-protection-collar band 10 (not illustrated in FIG. 2b). The closure 20 according to FIG. 2b differs from the closure 20 according to FIG. 2a by the configuration and arrangement of the interacting means 25 and/or 26 of the closure elements 21 and 22. The closure elements 21 and 22 according to FIG. 2b each have, arranged one beside the other on one side, a lug 25 and an aperture 26, which can be brought into engagement with a corresponding aperture 26 and lug 25 on the respectively other closure element 21, 22. Doubling up in this way on the interacting means 25 and/or 26 on the closure elements 21 and 22 of the closure 20 according to FIG. 2b provides for the closure 20 to be closed in a reliable manner, in particular such that it is sufficient to produce the closure elements 21 and 22 from metal or sheet metal with a thickness of just 0.5 mm.

Figure 2C:
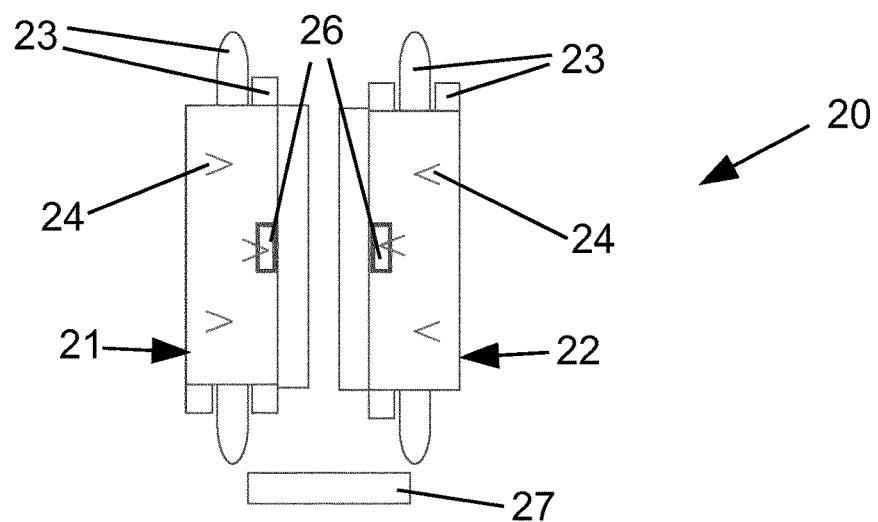
FIG. 2c shows a plan view of a third exemplary embodiment of a closure according to the invention for a fire-protection-collar element, in this case a fire-protection element in the form of a fire-protection-collar band according to the invention.

FIG. 2c shows a plan view of a third exemplary embodiment of a closure 20 according to the invention for a fire-protection-collar element 10 according to the invention, in the present case a fire-protection-collar band 10 (not illustrated in FIG. 2c). The closure 20 according to FIG. 2c differs from the closure 20 according to FIG. 2a by the configuration and arrangement of the interacting means 25 and/or 26 of the closure elements 21 and 22. The closure elements 21 and 22 according to FIG. 2c correspond to the closure element 22 according to FIG. 2a and, to this extent, are of the same configuration. The closure element 21 according to FIG. 2c, instead of the lug 25—as is provided for the closure element 21 according to FIG. 2a-likewise has an aperture 26, as is provided for the closure element 22 according to FIGS. 2a and 2c. A securing element 27, which interacts with the apertures 26 of the closure elements 21 and 22, is provided in order to close the closure 20 according to FIG. 2c, it being possible for said securing element 27, for this purpose, to be pushed through the two apertures 26 of the closure elements 21 and 22 and then to be mechanically deformed.

Figure 3A:
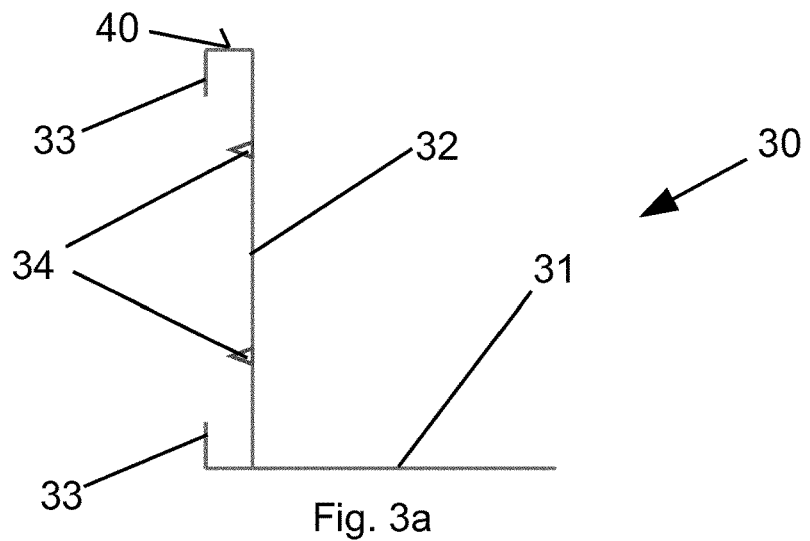
FIG. 3a shows a schematic side view of a first exemplary embodiment of a holder according to the invention for fastening a fire-protection collar on a structural part, in particular a wall, a ceiling and/or a floor.

FIG. 3a shows a schematic side view of a first exemplary embodiment of a holder 30 according to the invention, by means of which a fire-protection collar formed for closing through-passages in walls, ceilings and/or floors is fastened on a structural part, in particular a wall, a ceiling and/or a floor. The holder 30 has a portion 31 for fastening the holder on a structural part, in particular wall, ceiling and/or floor of a room, and a portion 32 with means 33 and 34 for anchoring and/or fixing a fire-protection-collar band 10 (not illustrated in FIG. 3a) on the holder 30. Provision is made here, in particular, for the fire-protection-collar band 10 to be fixed by virtue of the means 34 being deformed, for example using a screwdriver or a pair of pliers. The means 33 of the holder 30 according to FIG. 3a in the present case are designed to accommodate a single layer of a fire-protection-collar band 10. The fastening of the holder 30 on a structural part by way of the fastening portion 31 can take place, for example, using screws or similar fastening means.

Figure 3B:
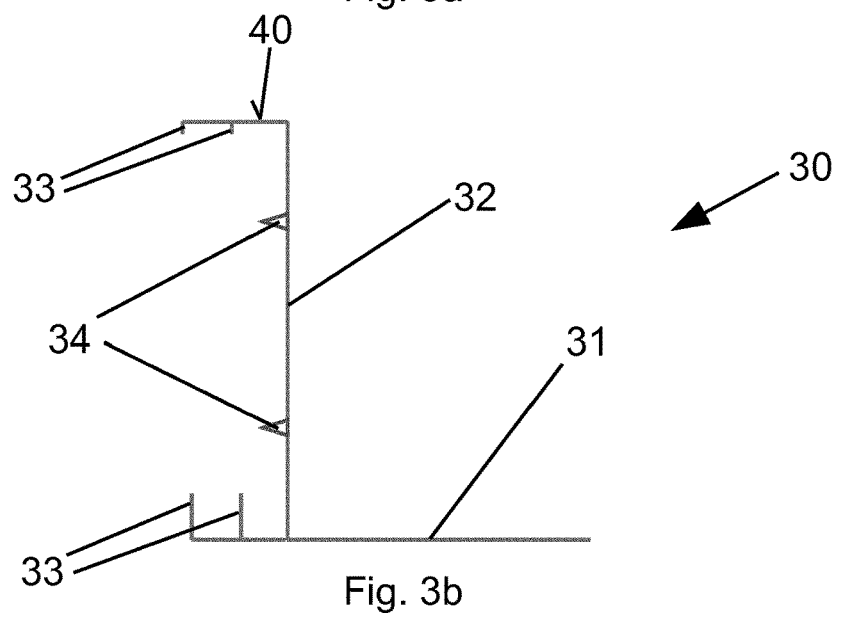
FIG. 3b shows a schematic side view of a second exemplary embodiment of a holder according to the invention for fastening a fire-protection collar on a structural part, in particular a wall, a ceiling and/or a floor.

FIG. 3b shows a schematic side view of a second exemplary embodiment of a holder 30 according to the invention, by means of which a fire-protection collar formed for closing through-passages in walls, ceilings and/or floors is fastened on a structural part, in particular a wall, a ceiling and/or a floor. The holder 30 according to FIG. 3b differs from the holder 30 according to FIG. 3a by the configuration of the means 33 for anchoring and/or fixing a fire-protection-collar band 10 (not illustrated in FIG. 3b) on the holder 30. In the case of the exemplary embodiment of the holder 30 according to FIG. 3b, the means 33 of the portion 32 are designed for accommodating two layers of a fire-protection-collar band 10. The layers of the fire-protection-collar band 10 can be arranged one above the other here. The means 34 of the portion 32 of the holder 30 according to FIG. 3b are configured and dimensioned here such that they can penetrate not just the first layer of the fire-protection-collar band 10, but also the second layer of the fire-protection-collar band 10. Overall, this provides for the two layers of the fire-protection-collar band to be retained firmly and reliably.

A further advantageous configuration of the invention provides for the means 33 of the portion 32 of the holder 30 according to FIG. 2b to be extended or dimensioned such that it is also possible to fix more than two layers of the fire-protection-collar band 10.

Figure 3C:
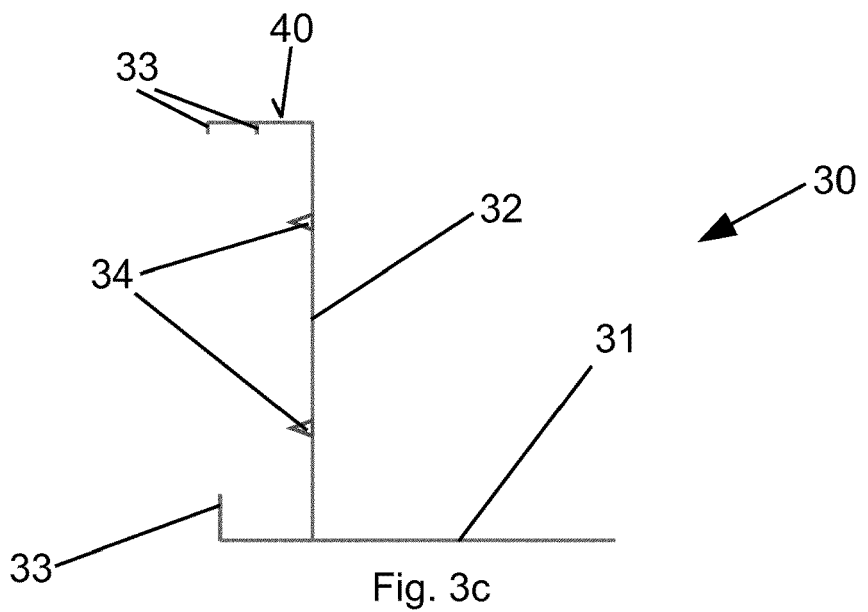
FIG. 3c shows a schematic side view of a third exemplary embodiment of a holder according to the invention for fastening a fire-protection collar on a structural part, in particular a wall, a ceiling and/or a floor.

FIG. 3c shows a schematic side view of a third exemplary embodiment of a holder 30 according to the invention, by means of which a fire-protection collar formed for closing through-passages in walls, ceilings and/or floors is fastened on a structural part, in particular a wall, a ceiling and/or a floor. The holder 30 according to FIG. 3c differs from the holder 30 according to FIG. 3b by the configuration of the means 33 for anchoring and/or fixing a fire-protection-collar band 10 (not illustrated in FIG. 3c) on the holder 30. In the case of the exemplary embodiment according to FIG. 3c, two means 33 serving for retaining or fixing the fire-protection-collar band 10 are provided merely on that side of the holder 30 which is illustrated at the top in FIG. 3c, whereas only one means 33 serving for retaining or fixing the fire-protection-collar band 10 is provided on that side of the holder 30 which is illustrated at the bottom in FIG. 3c. The configuration according to FIG. 3c has, in particular, installation-related advantages for the fitting of a fire-protection collar having a fire-protection-collar band 10 with more than one layer.

Fire-protection-collar bands 10 according to the invention, closures 20 according to the invention and holders 30 according to the invention advantageously make it possible to provide a fire-protection-collar system which is intended for closing through-passages in walls, ceilings and/or floors in the event of a fire, and a kit which is intended for forming a fire-protection collar for closing through-passages in walls, ceilings and/or floors in the event of a fire, can be produced straightforwardly and cost-effectively, in particular with only a small number of individual elements or components, and can be adapted in a flexible manner to different openings of feed-throughs or to pipes and/or lines of different cross sections.

A fire-protection collar for closing through-passages in walls, ceilings and/or floors in the event of a fire is formed as follows:

Arranging a fire-protection-collar element 10 around at least one pipeline passing through a wall, a ceiling or a floor, in particular such that, under the action of an elevated temperature, in particular in the event of a fire, volume-increasing material, preferably intumescent material, of the fire-protection-collar element 10 expands and closes the through-passage through the wall, the ceiling or the floor in order to prevent fire and/or smoke from spreading from one room into another room.

Fastening at least one holder 30, preferably at least three holders 30, on the fire-protection-collar element 10, either before or after the fire-protection-collar element 10 is arranged around the at least one pipeline.

Optionally aligning the at least one holder 30, preferably the at least three holders 30, in relation to the passage of the pipeline through the wall, the ceiling or the floor.

Fastening the at least one holder 30, preferably the at least three holders 30, by at least one fastening means, preferably a screw, on the wall, the ceiling or the floor.

The fire-protection-collar element 10 here is arranged, in particular, at a distance around the at least one pipeline passing through the wall, the ceiling or the floor, preferably at a distance of more than 2 mm, preferably at a distance of more than 5 mm, or even at a distance of more than 10 mm.

The fire-protection-collar element 10 is arranged around the at least one pipeline passing through the wall, the ceiling or the floor by virtue of the pipeline being wrapped with a fire-protection-collar band 10 in the region of the through-passage, by virtue of the fire-protection-collar band 10 being provided with at least one closure 20, and by virtue of the at least one closure 20 being closed. The fire-protection-collar band 10 here is provided with at least one closure 20 preferably either before or after the fire-protection-collar band 10 is arranged around the at least one pipeline. The at least one closure 20 is closed preferably either before or after the fire-protection-collar band 10 is arranged around the at least one pipeline.

Figure 4:
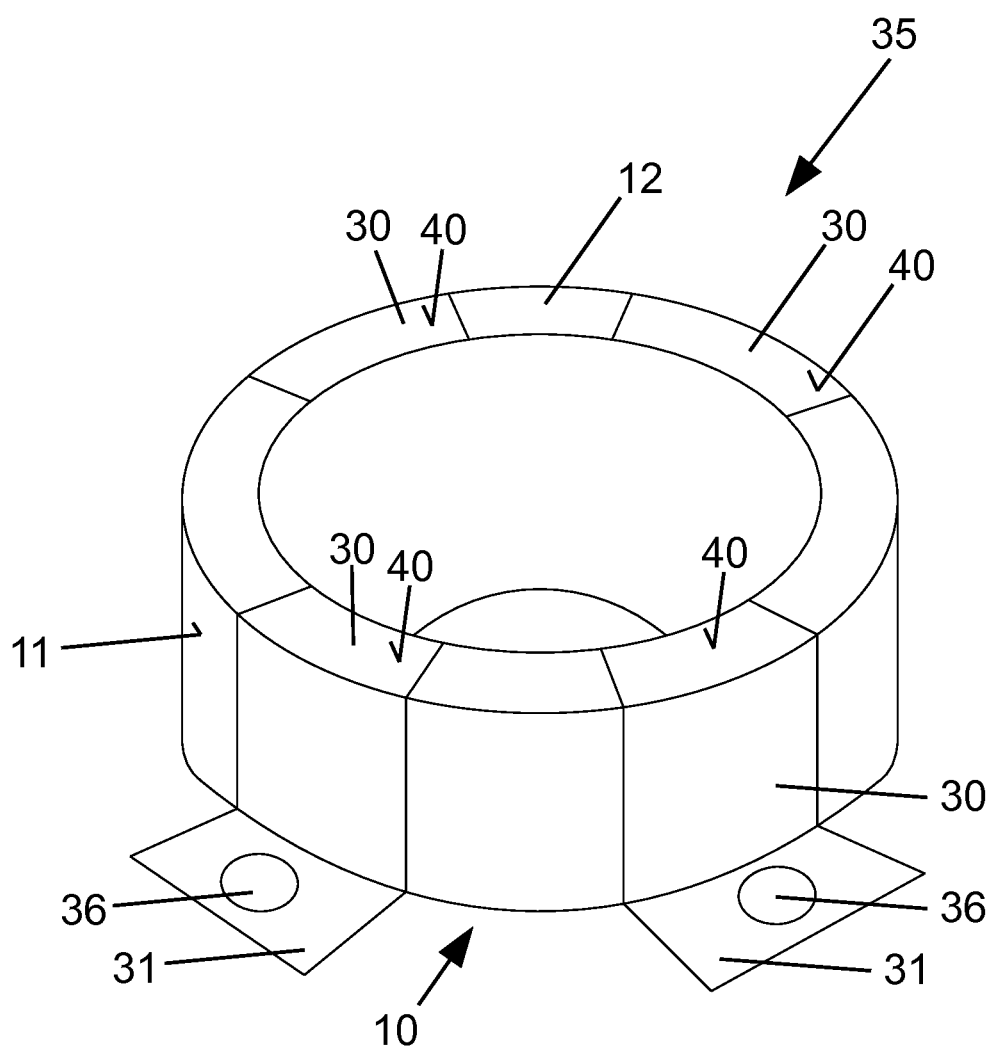
FIG. 4 shows a schematically perspective view of an exemplary embodiment of a fire-protection collar according to the invention.
Figure 10:
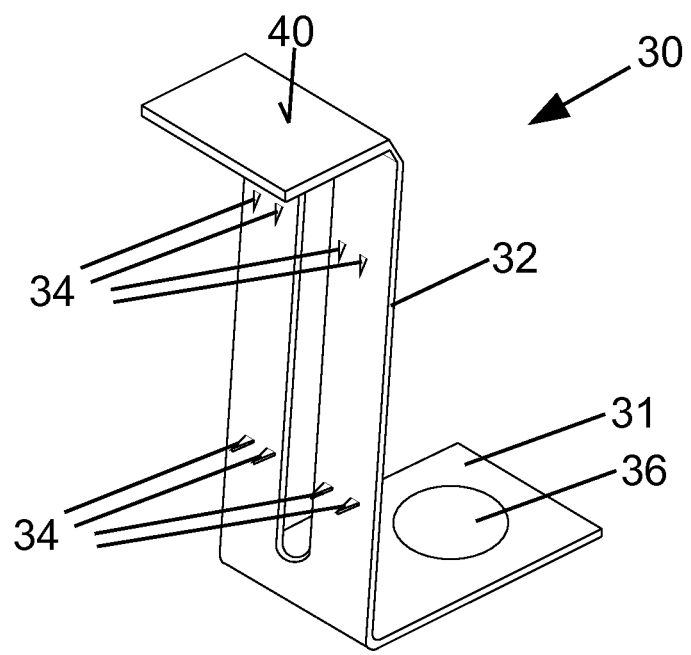
FIG. 10 shows a schematically perspective view of a further exemplary embodiment of a holder according to the invention for fastening a fire-protection collar on a structural part, in particular a wall, a ceiling and/or a floor.

FIG. 4 shows a fire-protection collar 35 designed according to the invention for closing a through-passage in a wall, ceiling and/or floor in the event of a fire. The fire-protection collar 35 comprises an essentially annular or tubular fire-protection-collar element 10 which, for fastening on a structural part, in particular wall, ceiling and/or floor, is provided in this case with four holders 30. The holders 30 here are distributed uniformly over the circumference of the annular fire-protection element 10. The fire-protection-collar element 10 has an annular or tubular metallic sheath 11 which, on its inner surface, is provided with an essentially annular or tubular fireproof lining 12 made of a material which increases in volume in the event of a fire, preferably an intumescent material. The lining 12 here is advantageously designed in the form of an annular or tubular moulding (cf., in particular, FIG. 7). The sheath 11 here is located preferably exclusively on the outer side of the lining 12. The holders 30 (cf. also FIG. 10) each have a portion 31, which serves for fastening on a structural part, in particular wall, ceiling and/or floor, and is positioned essentially parallel on the structural part. The portion 31 has an opening 36, which allows the holder 30 to be screwed on the structural part using a screw. The holders 30 (cf. also FIG. 10) also each have a portion 40, which is positioned on the side surface of the fire-protection-collar element 10 and accommodates the latter, and fixes it in position, between itself and the structural part. As can also be seen from FIG. 10, the holders 30 each also have means 34 for anchoring and/or fixing on or in the lining 12 of the fire-protection-collar element 10.

Figure 5:
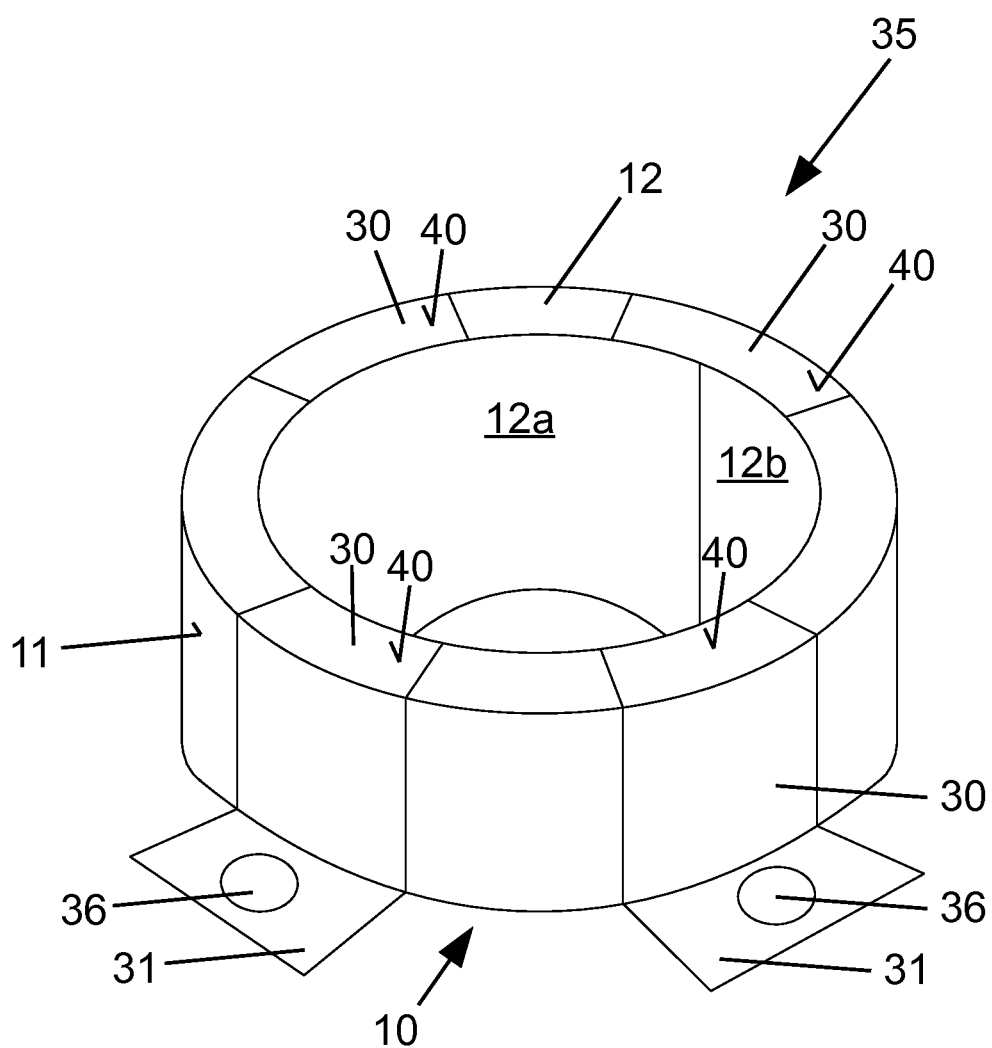
FIG. 5 shows a schematically perspective view of a further exemplary embodiment of a fire-protection collar according to the invention.

That exemplary embodiment of a fire-protection collar 35 according to the invention which is illustrated in FIG. 5 differs from that exemplary embodiment of a fire-protection collar 35 according to the invention which is illustrated in FIG. 4 by the design of the lining 12 of the fire-protection-collar element 10. Whereas the lining 12 of the fire-protection-collar element 10 in the exemplary embodiment according to FIG. 4 is designed advantageously in the form of an annular or tubular moulding (cf., in particular, FIG. 7), the lining 12 of the fire-protection-collar element 10 in the exemplary embodiment according to FIG. 5 is formed from an annularly or tubularly joined-together strip 12 made of a material which increases in volume in the event of a fire, preferably an intumescent material (cf., in particular, FIG. 8 and FIG. 9) (this being shown clearly in FIG. 5 by way of the portions of the intumescent strip 12 which are indicated by 12a and 12b). As in the exemplary embodiment according to FIG. 4, the metallic sheath 11 is located preferably exclusively on the outer side of the lining 12.

Figure 6:
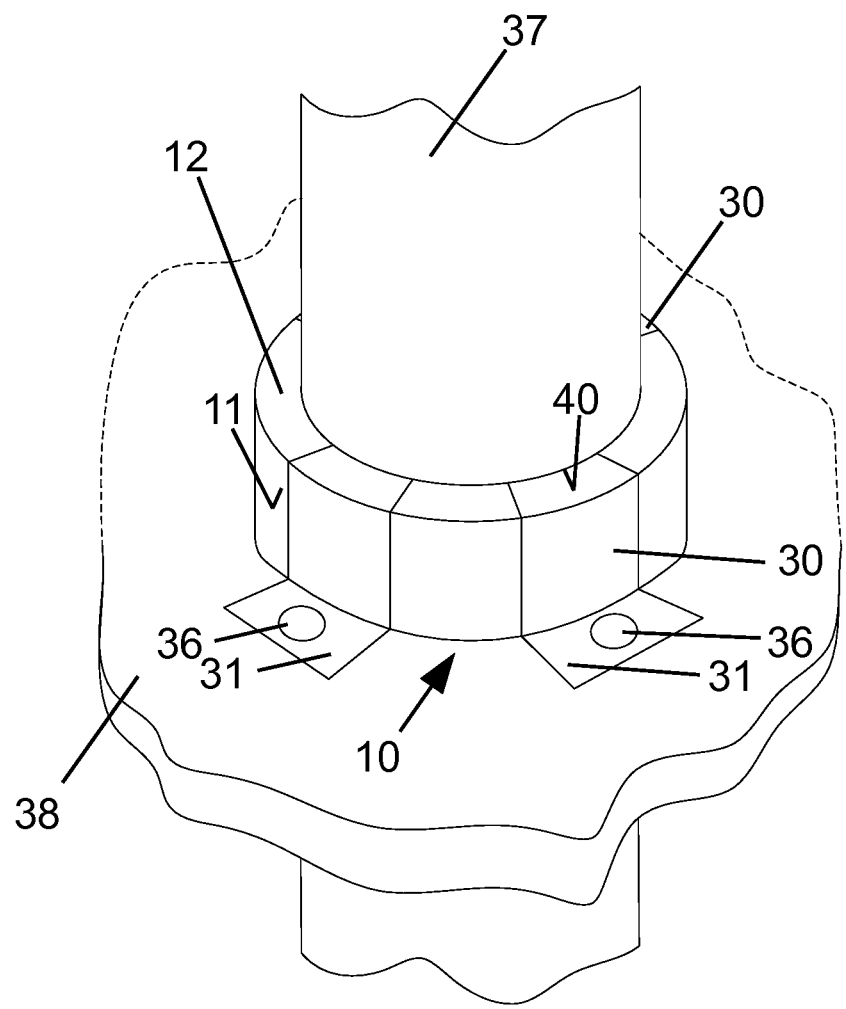
FIG. 6 shows a schematically perspective view of an exemplary embodiment of a fire-protection collar designed according to the invention for closing a through-passage in a wall in the event of a fire.

FIG. 6 shows the design of a fire-protection collar 35 for closing a through-passage in a wall 38. A fire-protection-collar element 10 (cf., in particular, FIG. 4 or FIG. 5) here is arranged around a pipeline 37 passing through the wall, in particular such that, under the action of an elevated temperature, in particular in the event of a fire, volume-increasing material, preferably intumescent material, of the lining 12 of the fire-protection-collar element 10 expands and closes the through-passage through the wall 38 in order to prevent fire and/or smoke from spreading from one room into another room. Four holders 30 are fastened on the fire-protection-collar element 10 such that the portion 31 of the respective holders 30 butts essentially parallel against the surface 39 of the wall 38 and can be fastened on the wall 38 by means of a screw. The fire-protection-collar element 10 here is arranged, in particular, at a distance around the pipeline 37 passing through the wall 38, preferably at a distance of more than 2 mm, preferably at a distance of more than 5 mm, or even at a distance of more than 10 mm.

The exemplary embodiments illustrated in the figures of the drawing and the exemplary embodiments explained in conjunction therewith serve merely to explain the invention and are not intended to limit the latter.

LIST OF REFERENCE SIGNS

10 Fire-protection-collar element/fire-protection-collar band
11 Foil
12 Moulding/strip made of or comprising a material which increases in volume in the event of a fire/intumescent strip
12a Portion of strip (12)
12b Portion of strip (12)
20 Closure
21 First closure element (closure (20))
22 Second closure element (closure (20))
23 Means for anchoring and/or fixing the fire-protection-collar band (10)
24 Means for anchoring and/or fixing the fire-protection-collar band (10)
25 Interacting means (lug) for connecting the closure elements (21 and 22)

26 Interacting means (aperture) for connecting the closure elements (21 and 22)
27 Interacting means for connecting the closure elements (21 and 22)
30 Holder
31 Portion (holder (30)) for fastening the holder (30) on a structural part, in particular wall, ceiling and/or floor of a room
32 Portion (holder (30)) with means (33, 34)
33 Means (portion (32)) for anchoring and/or fixing a fire-protection-collar band (10) on the holder (30)
34 Means (portion (32)) for anchoring and/or fixing a fire-protection-collar band (10) on the holder (30)
35 Fire-protection collar
36 Opening (portion (31))
37 Pipe/pipeline
38 Wall
39 Surface (wall (38))
40 Portion (holder (30))

The invention claimed is:

1. Fire-protection-collar element (10) for forming a fire-protection collar (35) for closing through-passages in walls (38), ceilings and/or floors in the event of a fire, having
at least one lining (12) which is made of or comprises an intumescent material which increases in volume in the event of a fire, and
a thin foil strip (11) made of metal, which is formed in an essentially tubular or annular manner, configured as a fireproof sheath (11), and positioned or fit with an inner surface thereof on the lining (12), wherein
opposite side peripheries of the lining (12) which run in the direction of the longitudinal extent of the fire-protection collar band (10) are spaced apart from the adjacent side peripheries of the foil strip (11) which run in the direction of the longitudinal extent of the fire-protection-collar band (10), with the width of the lining (12) being greater than the width of the foil strip (11), and
the lining (12) projects beyond the essentially tubular or annular foil strip (11) on both opposite side peripheries thereof.

2. Fire-protection-collar element (10) according to claim 1, wherein the foil strip (11) forms essentially the outer side of the fire-protection collar (35).

3. Fire-protection-collar element (10) according claim 1, having an essentially adhesive-free connection between the foil strip (11) and lining (12).

4. Fire-protection-collar element (10) according to claim 1, having the foil strip (11) being at least partially embedded or accommodated in the lining (12).

5. Fire-protection-collar element (10) according to claim 1, wherein the foil strip (11) is bimetallic.

6. Fire-protection-collar element (10) according to claim 1, wherein the foil strip (11) is a flexible metal foil and has a thickness of 10 µm to 100 µm.

7. Fire-protection-collar element (10) according to claim 1, wherein the lining (12) is formed from or by a non-prefoamed material.

8. Fire-protection-collar element (10) according to claim 1, having a maximum overall thickness of the fire-protection-collar band (10) ranging from 3 mm to 7 mm.

9. Fire-protection-collar element (10) according to claim 1, having
at least one holder (30) by which a fire-protection collar formed for closing through-passages in walls (38), ceilings and/or floors in the event of a fire is fastened on a structural part, in particular a wall (38), a ceiling and/or a floor of a room, and
the at least one holder (30) has a portion (31) for fastening the holder (30) on a structural part, in particular a wall, ceiling and/or floor of a room, and a portion (32) with means (33, 34) for anchoring and/or fixing the holder (30) on the fire-protection-collar element (10).

10. Fire-protection-collar element (10) according to claim 9, wherein the means (33, 34) for anchoring and/or fixing the holder (30) on the fire-protection-collar element (10) are lugs (33) which are bendable around side peripheries of the fire-protection-collar element (10) and/or lugs (34) which are bendable into the fire-protection-collar element (10).

11. Fire-protection-collar element (10) according to claim 9, wherein the holder (30) is designed for accommodating a plurality of layers of a fire-protection-collar band (10).

12. Fire-protection-collar element (10) according to claim 4, wherein the foil strip (11) is embedded or accommodated in an essentially surface-flush manner in the lining (12).

13. Fire-protection-collar element (10) according to claim 6, wherein the foil strip (11) has a thickness of 30 µm to 80 µm.

14. Fire-protection-collar element (10) according to claim 8, having a maximum overall thickness of the fire-protection-collar band (10) ranging from approximately 3.5 mm to approximately 6 mm.

\* \* \* \* \*